United States Patent
Lee (10) Patent No.: US 10,613,387 B2
(45) Date of Patent: Apr. 7, 2020

(54) LIQUID-CRYSTAL-ON-SILICON DEVICE AND ASSOCIATED METHOD FOR PREVENTING DARK-BANDING THEREIN

(71) Applicant: OmniVision Technologies, Inc., Santa Clara, CA (US)

(72) Inventor: Sinsuk Lee, Cupertino, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 16/002,331

(22) Filed: Jun. 7, 2018

(65) Prior Publication Data
US 2019/0377227 A1    Dec. 12, 2019

(51) Int. Cl.
*G02F 1/1335* (2006.01)
*G09G 3/36* (2006.01)
(Continued)

(52) U.S. Cl.
CPC .. *G02F 1/133611* (2013.01); *G02F 1/133553* (2013.01); *G02F 1/136277* (2013.01);
(Continued)

(58) Field of Classification Search
CPC ......... G02F 1/133611; G02F 1/133553; G02F 1/136277; G02F 1/133613; G02F 1/133615; G02F 2001/133616; G02F 1/133621; G02F 2001/133622; G02F 2001/133519; G02F 1/133; G02F 1/13; G02F 1/01; G02F 1/00; G02F 2001/136281; G02F 1/1362; G02F 1/136; G09G 3/3607; G09G 3/3696; G09G 3/36; G09G 3/3611; G09G 3/34; G09G 3/20; G09G 3/00; G09G 2320/0233; G09G 3/3413; G09G 3/3648; G09G 2310/0235; G09G 2310/0251
See application file for complete search history.

(56) References Cited

U.S. PATENT DOCUMENTS

2004/0174328 A1* 9/2004 Hudson ............... G09G 3/3614
                                                                345/87
2010/0296011 A1* 11/2010 Hirano ................. G02F 1/1347
                                                                349/2

OTHER PUBLICATIONS

Mizusaki et al, "Generation Mechanism of Residual Direct Current Voltage in a Liquid Crystal Display and Its Evaluation Parameters Related to Liquid Crystal and Alignment Layer Materials", J. App. Phys. 102, 014904 (2007). (Year: 2007).*

* cited by examiner

*Primary Examiner* — Julie Anne Watko
(74) *Attorney, Agent, or Firm* — Lathrop GPM LLP (57) ABSTRACT

A method for preventing dark banding in a liquid-crystal-on-silicon (LCoS) device, comprising illuminating, during a first timeframe, a transparent conductive layer of the LCoS device with a first illumination, the LCoS device including liquid-crystal layer between the transparent conductive layer and a reflective pixel-array. The method also includes illuminating, during a second timeframe, the transparent conductive layer with a second illumination, the second timeframe following both the first timeframe and a gap time-interval temporally between the first and second timeframes. The method also includes applying, to the transparent conductive layer, a layer-voltage equal to (i) during the first and second timeframes, an intra-frame voltage having an intra-frame root-mean-square amplitude and, (ii) during the gap time-interval, a gap voltage signal having a gap root-mean-square amplitude less than the intra-frame root-mean-square amplitude.

12 Claims, 5 Drawing Sheets

(51) Int. Cl.
*G02F 1/1362* (2006.01)
*G09G 3/34* (2006.01)
(52) U.S. Cl.
CPC ......... *G09G 3/3607* (2013.01); *G09G 3/3648* (2013.01); *G09G 3/34* (2013.01); *G09G 3/3413* (2013.01); *G09G 2310/0235* (2013.01); *G09G 2310/0251* (2013.01); *G09G 2320/0233* (2013.01)

LIQUID-CRYSTAL-ON-SILICON DEVICE AND ASSOCIATED METHOD FOR PREVENTING DARK-BANDING THEREIN

BACKGROUND

This invention relates to liquid-crystal-on-silicon (LCoS) displays, and specifically, prevention of dark-banding in LCoS displays.

LCoS displays are used in consumer electronics, such as mobile devices, hand-held projectors and near-eye displays. LCoS displays include an LCoS panel that reflects source illumination incident thereon. The source illumination may be a repeating temporal sequence of color frames, each color frame corresponding to a different color, or optical spectrum. The LCoS panel includes a liquid-crystal layer that has ions therein that produce a residual DC voltage difference across the liquid-crystal layer. This residual DC voltage causes the LCoS display to produce images that include artifacts, specifically, one or more dark bands across the image. The image quality of such LCoS-based devices depends in part on reducing such dark-banding.

SUMMARY OF THE EMBODIMENTS

In one aspect, a liquid-crystal-on-silicon device is disclosed. The device includes a transparent conductive layer, a reflective pixel-array, a liquid-crystal layer, a light source, and a voltage source. The liquid-crystal layer is between the reflective pixel-array and the transparent conductive layer. The light source is configured to illuminate, (i) during a first timeframe, the transparent conductive layer with a first illumination, and (ii) during a second timeframe, the transparent conductive layer with a second illumination, the second timeframe following both the first timeframe and a gap time-interval temporally between the first and second timeframes. The voltage source is electrically connected to the transparent conductive layer and configured to apply thereto a layer-voltage having (i) during the first and second timeframes, an intra-frame root-mean-square amplitude and (ii) during the gap time-interval, a gap root-mean-square amplitude less than the intra-frame root-mean-square amplitude.

In another aspect, a method for preventing dark banding in a liquid-crystal-on-silicon (LCoS) device is disclosed. The method includes illuminating, during a first timeframe, a transparent conductive layer of the LCoS device with a first illumination, the LCoS device including liquid-crystal layer between the transparent conductive layer and a reflective pixel-array. The method also includes illuminating, during a second timeframe, the transparent conductive layer with a second illumination, the second timeframe following both the first timeframe and a gap time-interval temporally between the first and second timeframes. The method also includes applying, to the transparent conductive layer, a layer-voltage equal to (i) during the first and second timeframes, an intra-frame voltage having an intra-frame root-mean-square amplitude and, (ii) during the gap time-interval, a gap voltage signal having a gap root-mean-square amplitude less than the intra-frame root-mean-square amplitude.

DETAILED DESCRIPTION OF THE EMBODIMENTS

Figure 1:
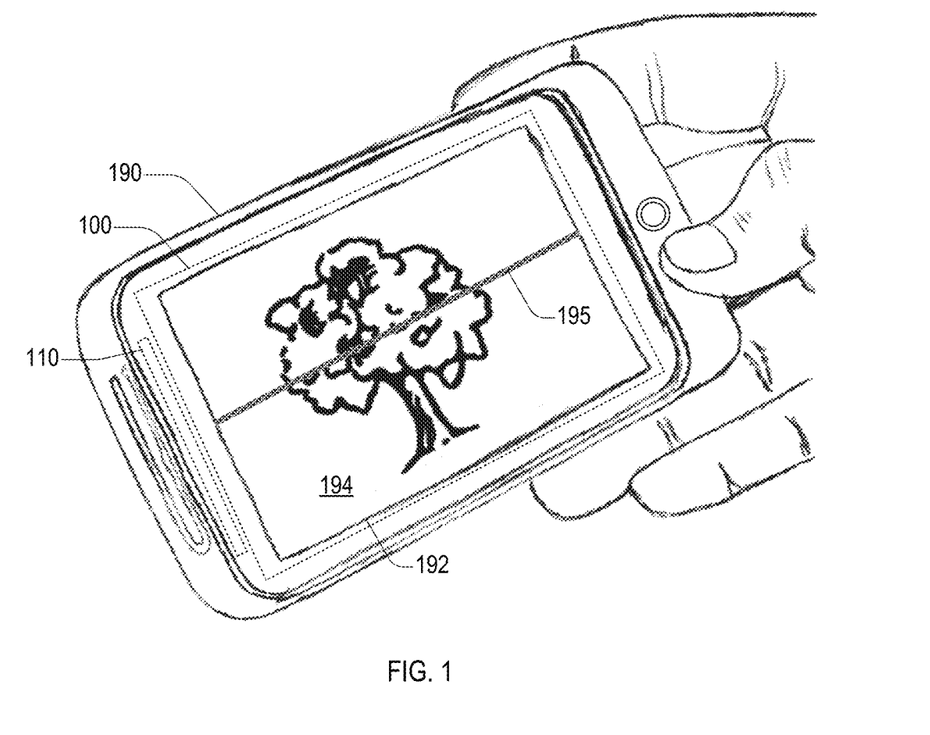
FIG. 1 depicts a device that includes an LCoS panel that produces an image on a screen, in an embodiment.

FIG. 1 depicts a device 190 that includes a flat-panel display 100, a light source 110, and a screen 192. Light source 110 illuminates flat-panel display 100, which generates an image 194 displayed on screen 192. Device 190 is, for example, a mobile communication device, a see-through head-mounted display system, or an LCoS projector. Image 194 includes a dark-band artifact 195.

Figure 2:
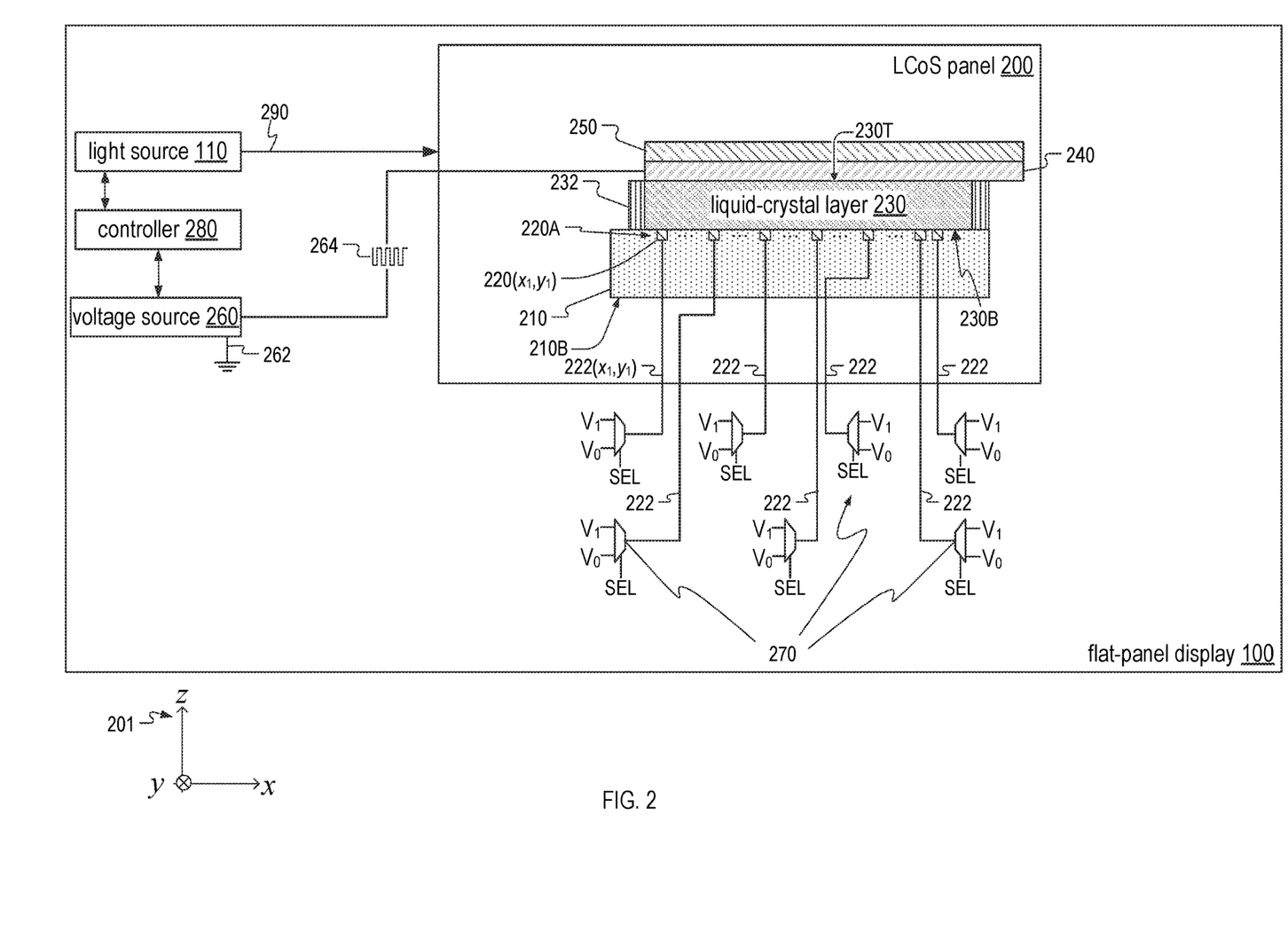
FIG. 2 illustrates a detailed cross-sectional view of the LCoS panel of the FIG. 1 device, in an embodiment.

FIG. 2 illustrates a detailed cross-sectional view of flat-panel display 100, which includes at least one of light source 110, an LCoS panel 200, a voltage source 260, and a controller 280. The cross-sectional view of FIG. 2 is parallel to the x-z plane of a coordinate system 201. Herein and unless stated otherwise, references to directions or planes denoted by at least one of x, y, or z refer to coordinate system 201.

LCoS panel 200 includes at least one of a semiconductor wafer 210, a pixel array 220A, a liquid-crystal layer 230, a dam 232, a transparent conductive layer 240, and a cover glass 250. Liquid-crystal layer 230 and transparent conductive layer 240 are between cover glass 250 and semiconductor wafer 210. Pixel array 220A is between the liquid-crystal layer 230 and a bottom surface 210B of semiconductor wafer 210. Liquid-crystal layer 230 has a top surface 230T opposite a bottom surface 230B.

LCoS panel 200 receives illumination 290 from light source 110. When LCoS panel 200 is part of a display, illumination 290 may illuminate LCoS panel 200 from the bottom or the sides. That is, illumination 290 may propagate in the +z direction and be incident on bottom surface 210B, or may propagate in the ±x and/or ±y direction and be incident on the side of at least one liquid-crystal layer 230 and transparent conductive layer 240. When LCoS panel 200 is part of a projector, illumination 290 may propagate in the −z direction and be incident on a top surface 230T of liquid-crystal layer 230.

Transparent conductive layer 240 may be a transparent conductive film and/or a transparent electrode layer, and may be formed of, or include, a conductive oxide such as indium tin oxide (ITO). Dam 232 may confine liquid-crystal layer 230. Semiconductor wafer 210 is formed of silicon, for example.

Voltage source 260 is configured to apply a layer-voltage 264, hereinafter also $V_{ITO}$, to transparent conductive layer 240 with respect to a reference voltage 262, which is a ground voltage, for example. Layer-voltage 264 may be time-varying with a DC-offset. For example, layer-voltage 264 is a square-wave voltage with a frequency between one and four kilohertz and amplitude between −1.0 V and +5.2 V. Voltage source 260 may be a programmable DC-to-DC converter programmed to supply layer-voltage 264.

Pixel array 220A includes a plurality of pixels 220 arranged in a two-dimensional array parallel to the x-y plane. Herein, pixel 220(x,y) denotes a pixel 220 centered at coordinates (x,y). Each pixel 220 may include a reflective surface facing transparent conductive layer 240. LCoS panel 100 is configured such that, during operation, each pixel 220 may be held at a respective pixel-voltage 222, or $V_p$, such that pixel-voltage 222(x,y) (or $V_p(x, y)$) is the voltage of pixel 220(x,y) and the voltage of any one pixel 220 is independent of the voltage of any other pixels 220. Pixel array 220A includes pixel 220($x_1$, $y_1$), which is at a pixel-voltage 222($x_1$, $y_1$). Pixel-voltage $V_p$ is, at a given time, equal to one of two voltages $V_0$ and $V_1$. Each pixel 220 is, for example, electrically connected to a respective multiplexer 270. Voltage $V_0$ may equal reference voltage 262.

Voltage $V_{240}$ of conductive layer 240 and voltage $V_p$ of pixels 220 result in liquid-crystal layer 230 having, between its surfaces 230T and 230B, an instantaneous LC-voltage $V_{LC}(x, y)$, which is spatially varying in (x, y) and expressed in equation (1):

$$V_{LC}(x,y) = |V_{ITO} - V_p(x,y)|. \quad (1)$$

Pixel-voltage 222 may be pulse-width modulated such that its root-mean-square value $V_p^{(rms)}$ equals one of a plurality of values between voltages $V_0$ and $V_1$. For example, when LCoS panel 100 has a bit-depth of N, the root-mean-square value of pixel-voltage 222 is one of $2^N$ values between $V_0$ and $V_1$. Accordingly, the voltage across liquid-crystal layer 230 has a root-mean-square value $V_L^{(rms)}(x, y)$ equal to the root-mean-square of $V_{LC}(x, y)$.

Liquid-crystal layer 230 may include ionic impurities, as discussed in Mizusaki et al, *J. App. Phys.* 102, 014904 (2007). Such impurities drift toward a top side of liquid-crystal layer 230 opposite pixel array 220A, which results in a residual voltage $V_r(t)$. This residual voltage changes the root-mean-square voltage difference between surfaces 230T and 230B from rms LC-voltage $V_{LC}^{(rms)}$ to a net rms LC-voltage $\varepsilon_{LC}^{(rms)}(x, y)$, as shown in equation (2):

$$\varepsilon_{LC}^{(rms)}(x,y) = V_{LL}^{(rms)}(x,y) + V_r(t). \quad (2)$$

Combining equations (1) and (2) yields:

$$\varepsilon_{LC}^{(rms)} = \mathrm{rms}(|V_{ITO} - V_p(x,y)|) + V_r(t). \quad (3)$$

When $V_{ITO}$ is pulse-width modulated at a frequency much higher than any time variation of pixel-voltage $V_p(x, y)$, $\mathrm{rms}(|V_{ITO} - V_p(x,y)|) \approx |V_{ITO}^{(rms)} - V_p^{(rms)}(x,y)|$ such that $$\varepsilon_{LC}^{(rms)} = |V_{ITO}^{(rms)} - V_p^{(rms)}(x,y)| + V_r(t). \quad (4)$$

When rms pixel-voltage $V_p^{(rms)}$ equals zero, or when voltages $V_{ITO}^{(rms)}$ and $V_r(t)$ are with respect to pixel-voltage $V_p^{(rms)}$, rms dark-band LC-voltage $\varepsilon_{LC}^{(rms)}$ satisfies equation (5):

$$\varepsilon_{LC} = V_{ITO}^{(rms)} + V_r(t). \quad (5)$$

Residual voltage $V_r(t)$ may increase from zero to a maximum value $V_{DC}$ over a transient period $\tau$, where examples of $V_{DC}$ and $\tau$ are 0.3±0.1 volts and 250±50 microseconds, respectively. Transient period $\tau$ results in dark-band artifacts 195, as explained in further detail below.

Illumination 290 may be field-sequential color (FSC) illumination, in which illumination 290 is a temporal interleaving of a plurality of optical pulse trains of different optical spectra, or colors. As such, illumination 290 may include a sequence of color fields separated by temporal gaps therebetween. Flat-panel display 100 may include a controller 280 communicatively connected to both light source 110 and voltage source 260. Controller 280 may be configured to synchronize layer-voltage 264 and illumination 290. Controller 280 may be integrated into one or both of light source 110 and voltage source 260.

Figure 3:
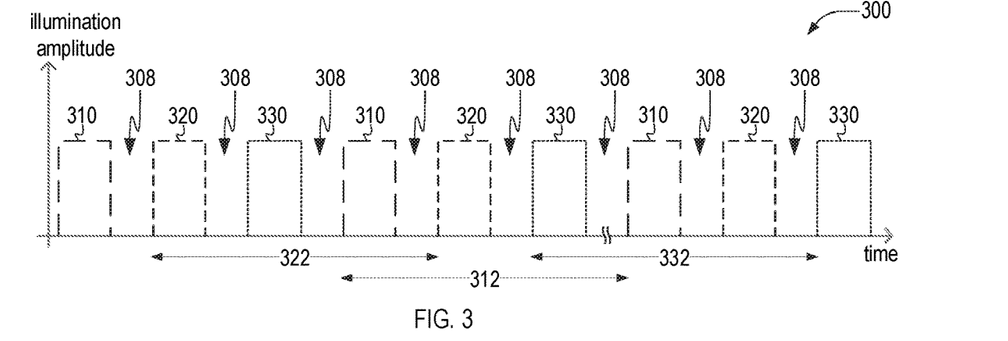
FIG. 3 is a graph illustrating time-dependence of field-sequential color illumination incident on the LCoS panel of the FIG. 1 device, in an embodiment.

FIG. 3 is a graph illustrating time-dependence of a FSC illumination amplitude 300, which is an example of the temporal illumination amplitude of illumination 290. FSC illumination amplitude 300 includes three color fields 310, 320, and 330, which correspond to respective colors of light. For example, color fields 310, 320, and 330 correspond to timeframes during which light source 110 illuminates transparent conductive layer 240 with red, green, and blue light, respectively. Color fields 310, 320, and 333 have respective periods 312, 322, and 332, which are each, for example 3.0±1.0 milliseconds. Illumination amplitude 300 has a minimum value, e.g., zero, during a plurality of gap time-intervals 308 occurring between temporally adjacent color fields. Each gap time-interval 308 is fifty microseconds, for example. Gap time-interval 308 may be changed, e.g., increased, such that it exceeds characteristic time $\tau$ of the residual voltage $V_r(t)$ associated with liquid crystal panel 200.

Figure 4:
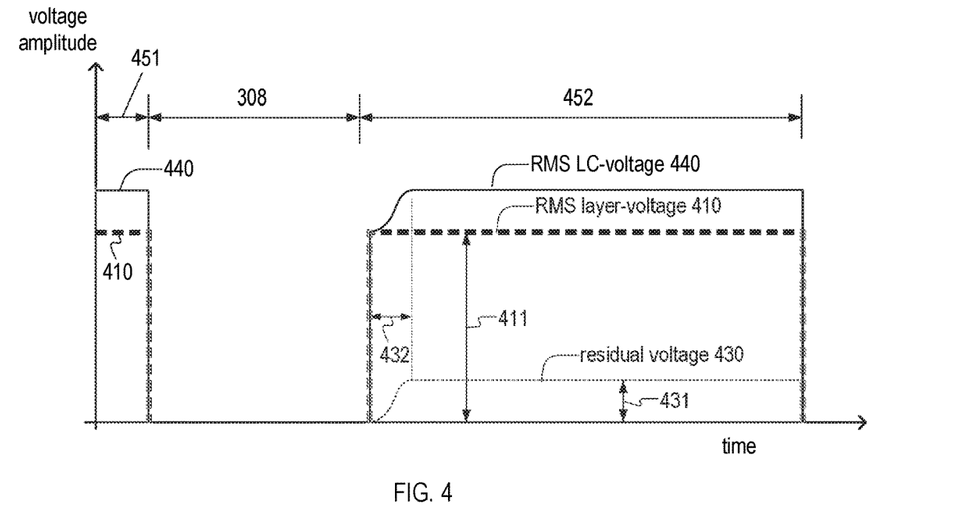
FIG. 4 is a plot illustrating color fields, an rms layer-voltage, a residual voltage, and an rms dark-band LC-voltage associated with the LCoS panel of the FIG. 1 device, in an embodiment.

FIG. 4 is a plot illustrating color fields 451 and 452, an rms layer-voltage 410, a residual voltage 430, and an rms dark-band LC-voltage 440. Color fields 451 and 452 may each be one of color fields 310, 320, and 330, illustrated in FIG. 3, and are temporally separated by gap time-interval 308. Color fields 451 and 452 may each be a different one of color fields 310, 320, and 330, such that color fields 451 and 452 corresponds to light source 110 illuminating transparent conductive layer 240 with, respectively, a first color of light and a second color of light that differs from the first color.

Root-mean-square layer-voltage 410 has an intra-frame amplitude 411, and is an example of the root-mean-square of layer-voltage 264 ($V_{ITO}^{(rms)}$). Residual voltage 430 is an example of residual voltage $V_r(t)$ and has a steady-state residual voltage 431 and a transient period 432, which are examples of maximum value $V_{DC}$ and a transient period $\tau$, respectively.

Root-mean-square dark-band LC-voltage 440 is the sum of rms layer-voltage 410 and residual voltage 430, and hence is an example of net rms LC-voltage $\varepsilon_{LC}^{(rms)}(x, y)$ of equation (5) when conditions thereof apply. Transient period 432 at the start of rms dark-band LC-voltage 440 results in dark-band artifact 195 in displayed image 194.

Figure 5:
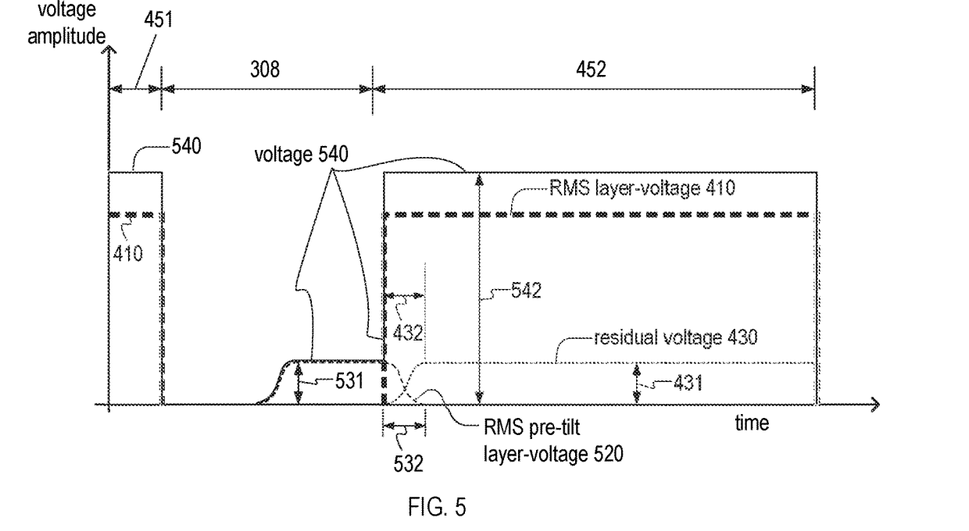
FIG. 5 is similar to the plot of FIG. 4, with the addition of an rms pre-tilt layer-voltage that may be applied to a conductive layer of the LCoS panel of the FIG. 1 device, in an embodiment.

FIG. 5 is similar to FIG. 4, and includes an rms pre-tilt layer-voltage 520. When applied to conductive layer 240, voltage 520 prevents formation of dark-band artifact 195 by causing liquid crystal molecules of liquid-crystal layer 230 to tilt in a direction opposite to residual voltage 430, hence resulting in a pre-compensation for residual voltage 430. FIG. 5 also includes a net rms LC-voltage 540, which replaces rms dark-band LC-voltage 440, and is a sum of rms layer-voltage 410 and rms pre-tilt layer-voltage 520. Root-mean-square pre-tilt voltage 520 is, for example, applied to transparent conductive layer 240, such that net rms LC-voltage 540 is an example of the root-mean-square of layer-voltage 264 ($V_{ITO}^{(rms)}$). Net rms LC-voltage 540 is an example of net rms LC-voltage $\varepsilon_{LC}^{(rms)}(x, y)$ of equation (5) when conditions thereof apply.

Root-mean-square pre-tilt layer-voltage 520 has a steady-state amplitude 531, which may be equal to steady-state residual voltage 431 within ten-percent of steady-state residual voltage 431. Root-mean-square pre-tilt layer-voltage 520 has a decay time 532, which may be equal to transient period 432 to within ten percent thereof. Alternatively, decay time 532 may be minimized, e.g., according to physical limitations of voltage source 260 such as its resistive-capacitive delay. Since net rms LC-voltage 540 lacks a transient period, LCoS panel 200 will not display dark-band artifact 195 in response thereto. Net rms LC-voltage 540 has an amplitude 531 during part of gap time-interval 308, and an intra-frame amplitude 542, which is a sum of amplitudes 411 and 431.

Figure 6:
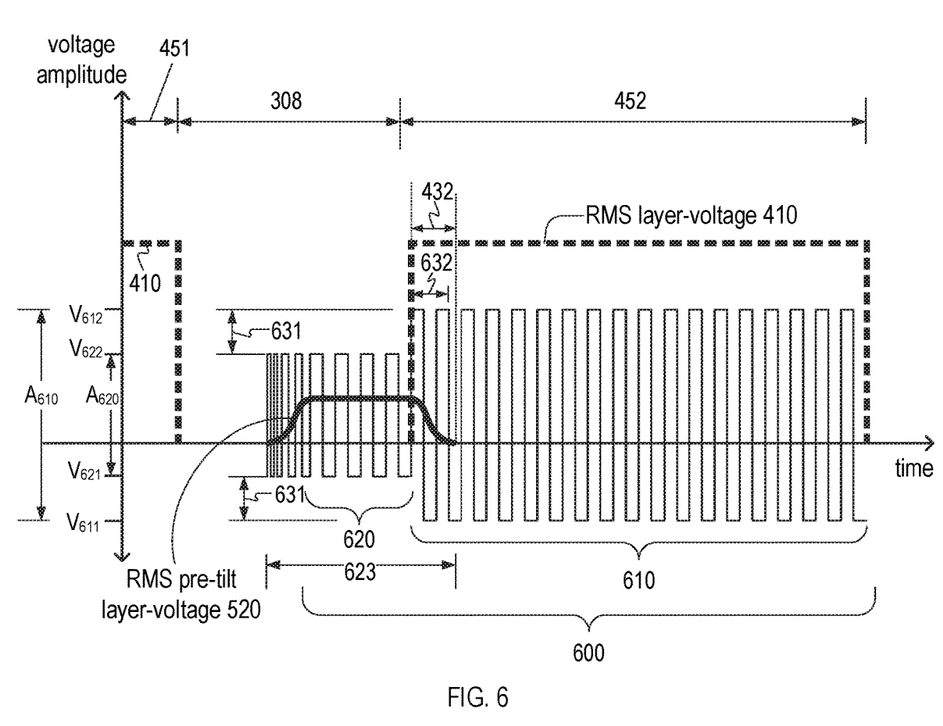
FIG. 6 is illustrates a pulse-width modulated voltage signal, which is an example of the layer-voltage applied to the conductive layer of the LCoS panel of the FIG. 1 device, in an embodiment.

FIG. 6 is illustrates a pulse-width modulated voltage signal 600, which is an example of layer-voltage 264 ($V_{ITO}$) supplied by voltage source 260. Voltage signal 600 includes a voltage component 610 and a voltage component 620, which have respective rms values corresponding to rms layer-voltage 410 and rms pre-tilt layer-voltage 520. Voltage component 620 is, for example, pulse-width modulated such that its rms value equals rms pre-tilt layer-voltage 520. While FIG. 6 illustrates voltage component 610 starting when voltage component 620 ends, voltage components 610 and 620 may alternatively overlap in time, such that voltage signal 600 is a combination, e.g., a sum, of components 610 and 620. For example, one or both of voltage components 610 and 620 may be non-zero during a time-interval 632 that begins at the start of RMS layer-voltage 410. Time-interval 632 may equal at least one of transient period 432 and decay time 532.

Voltage component 610 may be periodic, e.g., a square wave, sawtooth wave, or a sinusoid, and has an amplitude $A_{610}=(V_{612}-V_{611})$. Voltage component 620 may be periodic, e.g., a square wave, sawtooth wave, or a sinusoid, and has an amplitude $A_{620}=(V_{622}-V_{621})$, where $A_{610}>A_{620}$. In an embodiment, $V_{612}=5.2\pm0.2$ V, $V_{611}=-1.0\pm0.2$ V, $V_{622}=4.9\pm0.2$ V, and $V_{621}=-0.7\pm0.2$ V. Amplitudes $V_{612}$ and $V_{622}$ may differ by an offset voltage 631, which is also equal to a difference between amplitudes $V_{621}$ and $V_{611}$, as illustrated in FIG. 6. Offset voltage 631 may be equal to steady-state residual voltage 431 within a tolerance of five percent of steady-state residual voltage 431.

Voltage component 620 has a temporal duration 623, which may be greater or equal to transient period 432 to enable the aforementioned pre-compensatory tilt of liquid crystal molecules of liquid-crystal layer 230. Temporal duration 623 is, for example, equal to a time interval during which RMS pre-tilt layer-voltage 520 is non-zero.

Figure 7:
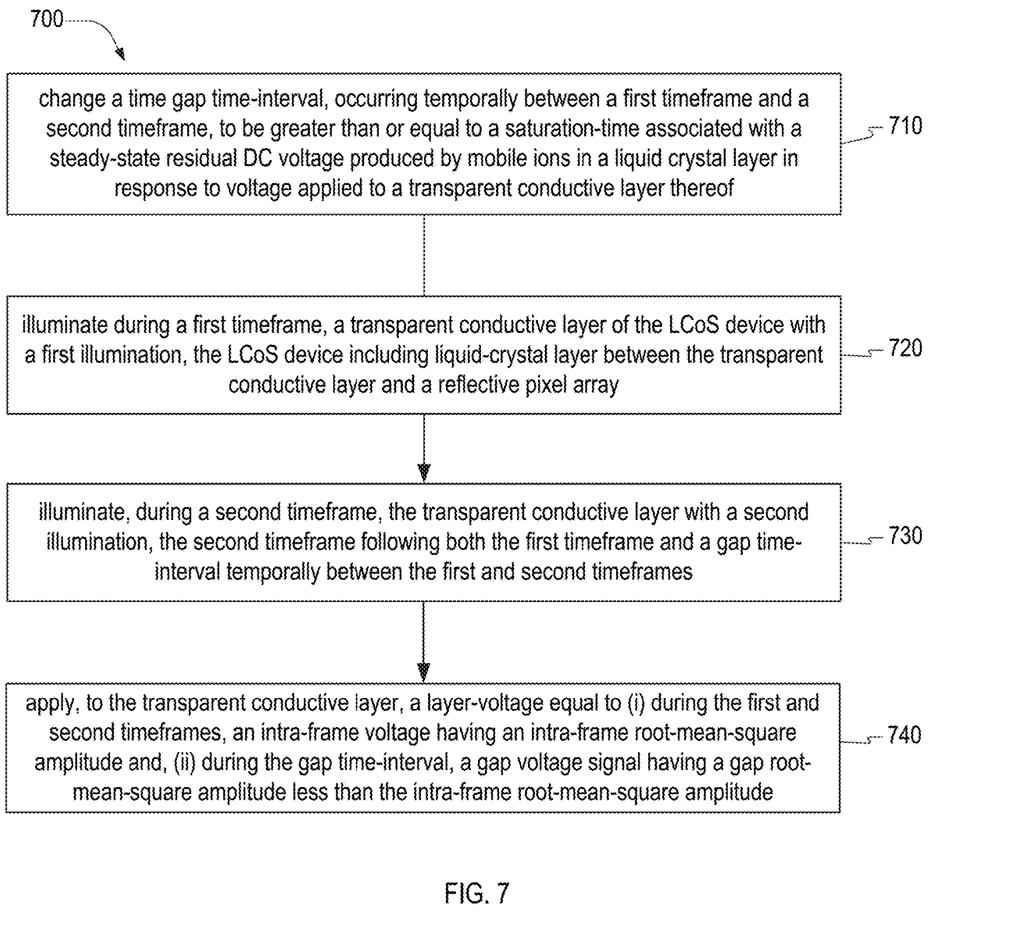
FIG. 7 is a flowchart illustrating a method for preventing dark banding in an LCoS device that includes a liquid-crystal layer between the transparent conductive layer and a reflective pixel-array, in an embodiment.

FIG. 7 is a flowchart illustrating a method 700 for preventing dark banding in an LCoS device that includes a liquid-crystal layer between the transparent conductive layer and a reflective pixel-array. Method 700 includes at least one of steps 710, 720, 730, and 740.

Step 710 includes changing a gap time-interval, occurring temporally between a first timeframe and a second timeframe, to be greater than or equal to a saturation-time associated with a steady-state residual DC voltage produced by mobile ions, in the liquid crystal layer, in response to voltage applied to the transparent conductive layer. In an example of step 710, controller 280 changes, e.g., by increasing, gap time-interval 308 to equal or exceed transient period 432.

Step 720 includes illuminating, during a first timeframe, a transparent conductive layer of the LCoS device with a first illumination. In an example of step 720, light source 110 illuminates transparent conductive layer 240 during color field 451 of FIG. 4.

Step 730 includes illuminating, during a second timeframe, the transparent conductive layer with a second illumination, the second timeframe following both the first timeframe and a gap time-interval temporally between the first and second timeframes. In an example of step 730, light source 110 illuminates transparent conductive layer 240 during color field 452, in which gap time-interval 308 is temporally between color fields 451 and 452.

Step 740 includes applying, to the transparent conductive layer, a layer-voltage equal to (i) during the first and second timeframes, an intra-frame voltage having an intra-frame root-mean-square amplitude and, (ii) during the gap time-interval, a gap voltage signal having a gap root-mean-square amplitude less than the intra-frame root-mean-square amplitude. In an example of step 740, voltage source 260 applies layer-voltage 264 to transparent conductive layer 240, where steady-state amplitude 531 and intra-frame amplitude 411 are, respectively, examples of the gap root-mean-square amplitude and the intra-frame root-mean-square amplitude. Pulse-width modulated voltage signal 600 is an example of layer-voltage 264.

In method 700, the reflective pixel-array may include a first reflective pixel having a first pixel-voltage applied thereto. Step 740 may result in a difference between voltage of the transparent conductive layer and voltage of the first reflective pixel being equal to a difference between the layer-voltage and the first pixel-voltage. For example, a voltage difference between transparent conductive layer 240 and the reflective pixel $220(x_1, y_1)$ being equal to a difference between layer-voltage 264 and first pixel-voltage $222(x_1, y_1)$.

Combinations of Features

Features described above as well as those claimed below may be combined in various ways without departing from the scope hereof. The following examples illustrate some possible, non-limiting combinations:

(A1) denotes an LCoS device that includes a transparent conductive layer, a reflective pixel-array, a liquid-crystal layer, a light source, and a voltage source. The liquid-crystal layer is between the reflective pixel-array and the transparent conductive layer. The light source is configured to illuminate, (i) during a first timeframe, the transparent conductive layer with a first illumination, and (ii) during a second timeframe, the transparent conductive layer with a second illumination, the second timeframe following both the first timeframe and a gap time-interval temporally between the first and second timeframes. The voltage source is electrically connected to the transparent conductive layer and configured to apply thereto a layer-voltage having (i) during the first and second timeframes, an intra-frame root-mean-square amplitude and (ii) during the gap time-interval, a gap root-mean-square amplitude less than the intra-frame root-mean-square amplitude.

(A2) In the LCoS device denoted by (A1), the liquid-crystal layer may include ions therein that, in response to voltage applied to the transparent conductive layer, produce a residual direct-current (DC) voltage within a saturation-time and, the gap time-interval being greater than or equal to the saturation-time.

(A3) In the LCoS device denoted by (A2), the gap root-mean-square amplitude may be equal to the residual DC voltage within a ten-percent relative difference.

(A4) In any LCoS device denoted by one of (A1) through (A3), the layer-voltage may be a pulse-width modulated signal having (i) during the first and second timeframes, an intra-frame amplitude and (ii) during the gap time-interval, a gap amplitude less than the intra-frame root-mean-square amplitude, a difference between the intra-frame amplitude and the gap amplitude deviating from twice the residual DC voltage by less than ten percent thereof.

(A5) In any LCoS device denoted by one of (A1) through (A4), the second illumination may have a second frequency spectrum that differs from a first frequency spectrum of the first illumination.

(A6) In any LCoS device denoted by one of (A1) through (A5), the reflective pixel-array may include a first reflective pixel having a first pixel-voltage applied thereto, a difference between voltage of the transparent conductive layer and voltage of the first reflective pixel being equal to a difference between the layer-voltage and the first pixel-voltage.

(B1) denotes a method for preventing dark banding in a liquid-crystal-on-silicon (LCoS) device is disclosed. The method denoted (B1) includes illuminating, during a first timeframe, a transparent conductive layer of the LCoS device with a first illumination, the LCoS device including liquid-crystal layer between the transparent conductive layer and a reflective pixel-array. The method also includes illuminating, during a second timeframe, the transparent conductive layer with a second illumination, the second timeframe following both the first timeframe and a gap time-interval temporally between the first and second timeframes. The method also includes applying, to the transparent conductive layer, a layer-voltage equal to (i) during the first and second timeframes, an intra-frame voltage having an intra-frame root-mean-square amplitude and, (ii) during the gap time-interval, a gap voltage signal having a gap root-mean-square amplitude less than the intra-frame root-mean-square amplitude.

(B2) The method denoted by (B1) may further include changing the gap time-interval to be greater than or equal to a saturation-time associated with a steady-state residual DC voltage, produced by mobile ions in the liquid crystal layer, in response to voltage applied to the transparent conductive layer.

(B3) In the method denoted by (B2), the gap root-mean-square amplitude may equal to the residual DC voltage within a ten-percent relative difference.

(B4) In any method denoted by one of (B1) through (B3), the layer-voltage may be a pulse-width modulated signal having (i) during the first and second timeframes, an intra-frame amplitude and (ii) during the gap time-interval, a gap amplitude less than the intra-frame root-mean-square amplitude, a difference between the intra-frame amplitude and the gap amplitude deviating from twice the residual DC voltage by less than ten percent thereof.

(B5) In any method denoted by one of (B1) through (B4), in the step of illuminating the transparent conductive layer with a second illumination, the second illumination may have a second frequency spectrum that differs from a first frequency spectrum of the first illumination.

(B6) In any method denoted by one of (B1) through (B5), the reflective pixel-array may include a first reflective pixel having a first pixel-voltage applied thereto, the step of applying a layer-voltage may result in a difference between voltage of the transparent conductive layer and voltage of the first reflective pixel being equal to a difference between the layer-voltage and the first pixel-voltage Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A liquid-crystal-on-silicon device comprising:
    a transparent conductive layer;
    a reflective pixel-array;
    a liquid-crystal layer between the reflective pixel-array and the transparent conductive layer;
    a light source configured to illuminate, (i) during a first timeframe, the transparent conductive layer with a first illumination, and (ii) during a second timeframe, the transparent conductive layer with a second illumination, the second timeframe following both the first timeframe and a gap time-interval temporally between the first and second timeframes; and
    a voltage source electrically connected to the transparent conductive layer and configured to apply thereto a layer-voltage having (i) during the first and second timeframes, an intra-frame root-mean-square amplitude and (ii) during the gap time-interval, a gap root-mean-square amplitude less than the intra-frame root-mean-square amplitude.

2. The liquid-crystal-on-silicon device of claim 1, the liquid-crystal layer including ions therein that, in response to voltage applied to the transparent conductive layer, produce a residual direct-current (DC) voltage within a saturation-time and, the gap time-interval being greater than or equal to the saturation-time.

3. The liquid-crystal-on-silicon device of claim 2, the gap root-mean-square amplitude being within ten percent of the residual DC voltage.

4. The liquid-crystal-on-silicon device of claim 2, the layer-voltage being a pulse-width modulated signal having (i) during the first and second timeframes, an intra-frame amplitude and (ii) during the gap time-interval, a gap amplitude less than the intra-frame root-mean-square amplitude, a difference between the intra-frame amplitude and the gap amplitude being within five percent of the residual DC voltage.

5. The liquid-crystal-on-silicon device of claim 1, the second illumination having a second frequency spectrum that differs from a first frequency spectrum of the first illumination.

6. The liquid-crystal-on-silicon device of claim 1, the reflective pixel-array including a first reflective pixel having a first pixel-voltage applied thereto, a difference between voltage of the transparent conductive layer and voltage of the first reflective pixel being equal to a difference between the layer-voltage and the first pixel-voltage.

7. A method for preventing dark banding in a liquid-crystal-on-silicon (LCoS) device, comprising steps of:
    illuminating, during a first timeframe, a transparent conductive layer of the LCoS device with a first illumination, the LCoS device including liquid-crystal layer between the transparent conductive layer and a reflective pixel-array;
    illuminating, during a second timeframe, the transparent conductive layer with a second illumination, the second timeframe following both the first timeframe and a gap time-interval temporally between the first and second timeframes; and
    applying, to the transparent conductive layer, a layer-voltage equal to (i) during the first and second timeframes, an intra-frame voltage having an intra-frame root-mean-square amplitude and, (ii) during the gap time-interval, a gap voltage signal having a gap root-mean-square amplitude less than the intra-frame root-mean-square amplitude.

8. The method of claim 7, further comprising:
changing the gap time-interval to be greater than or equal to a saturation-time associated with a steady-state residual DC voltage, produced by mobile ions in the liquid crystal layer, in response to voltage applied to the transparent conductive layer.

9. The method of claim 8, the gap root-mean-square amplitude being within ten percent of the residual DC voltage.

10. The method of claim 7, the layer-voltage being a pulse-width modulated signal having (i) during the first and second timeframes, an intra-frame amplitude and (ii) during the gap time-interval, a gap amplitude less than the intra-frame root-mean-square amplitude, a difference between the intra-frame amplitude and the gap amplitude being within five percent of the residual DC voltage.

11. The method of claim 7, in the step of illuminating the transparent conductive layer with a second illumination, the second illumination having a second frequency spectrum that differs from a first frequency spectrum of the first illumination.

12. The method of claim 7, the reflective pixel-array including a first reflective pixel having a first pixel-voltage applied thereto, the step of applying a layer-voltage resulting in a difference between voltage of the transparent conductive layer and voltage of the first reflective pixel being equal to a difference between the layer-voltage and the first pixel-voltage.

* * * * *